(12) United States Patent
Finn et al.

(10) Patent No.: US 12,092,172 B2
(45) Date of Patent: Sep. 17, 2024

(54) CONTROLLABLE CLUTCH ASSEMBLY

(71) Applicant: Means Industries, Inc., Saginaw, MI (US)

(72) Inventors: Dustin M. Finn, Essexville, MI (US); Conner S. Jurs, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/132,800

(22) Filed: Apr. 10, 2023

(65) Prior Publication Data
US 2023/0332653 A1 Oct. 19, 2023

Related U.S. Application Data

(60) Provisional application No. 63/331,037, filed on Apr. 14, 2022.

(51) Int. Cl.
*F16D 41/12* (2006.01)

(52) U.S. Cl.
CPC .................................. *F16D 41/125* (2013.01)

(58) Field of Classification Search
CPC .............................. F16D 41/125; F16D 41/16
See application file for complete search history.

(56) References Cited

U.S. PATENT DOCUMENTS

| | | | |
|---|---|---|---|
| 4,212,557 A | 7/1980 | Overbeek | |
| 7,766,790 B2 | 8/2010 | Stevenson et al. | |
| 8,657,089 B2 | 2/2014 | Yang | |
| 9,638,266 B2* | 5/2017 | Kimes | F16D 41/125 |
| 10,533,617 B2 | 1/2020 | Uppal et al. | |
| 10,968,985 B2 | 4/2021 | Fliearman et al. | |
| 2004/0159517 A1* | 8/2004 | Thomas | F16D 41/16 |
| | | | 192/39 |
| 2011/0233026 A1* | 9/2011 | Pawley | F16D 41/08 |
| | | | 192/41 R |
| 2014/0367217 A1* | 12/2014 | Richardson | F16D 11/16 |
| | | | 192/71 |
| 2015/0323020 A1* | 11/2015 | Papania | F16D 41/14 |
| | | | 74/665 GE |
| 2018/0128328 A1* | 5/2018 | Diaz | F16D 48/06 |
| 2019/0248247 A1* | 8/2019 | Yamaguchi | B60K 1/02 |
| 2020/0109749 A1* | 4/2020 | Thomas | F16D 41/125 |
| 2021/0285505 A1* | 9/2021 | Etzel | F16D 41/16 |

OTHER PUBLICATIONS

PCT/US2023/18066, Search Report, Jul. 6, 2023.
PCT/US2023/18066, Written Opinion, Jul. 6, 2023.
PCT/US2023/18066, Strategy, Jul. 6, 2023.

\* cited by examiner

*Primary Examiner* — Timothy Hannon
(74) *Attorney, Agent, or Firm* — Burgess Law Office, PLLC

(57) ABSTRACT

A clutch assembly or module that includes multiple components and one-way clutches. The clutch assembly or module functions as a releasable torque transmitting mechanism that provides a mechanical engagement between mating parts wherein the multiple components and one-way clutches cooperate to control the torque flow path between a drive or input member and a driven or output member.

15 Claims, 10 Drawing Sheets

CONTROLLABLE CLUTCH ASSEMBLY

CROSS-REFERENCE TO RELATED APPLICATIONS

This application claims the benefit of U.S. Provisional Application No. 63/331,037, filed Apr. 14, 2022. The disclosure of the above application is incorporated herein by reference.

BACKGROUND OF THE INVENTION

1. Field of the Invention

The invention generally relates to a vehicle power train or drive system; and, more specifically, a clutch assembly including locking elements for coupling and decoupling clutch members to control power flow or power transfer in a vehicle drive train.

2. Description of Related Art

Clutch assemblies, including one-way clutches or brakes, may include a locking member movable to an engaged/locked position. A one-way clutch produces a mechanical connection between rotating or stationary components. In one example, the locking members move from an engaged position to a nonengaged position when a driven component overruns a driving or stationary component. An actuator or actuation mechanism may control the locking member's movement between an engaged/locked position and a non-engaged/unlocked position.

SUMMARY OF THE INVENTION

A clutch assembly having a rotatable first component and a second rotatable component. An active one-way clutch is between the first rotatable component and the second rotatable component. A passive one-way clutch is between the first rotatable component and the second rotatable component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
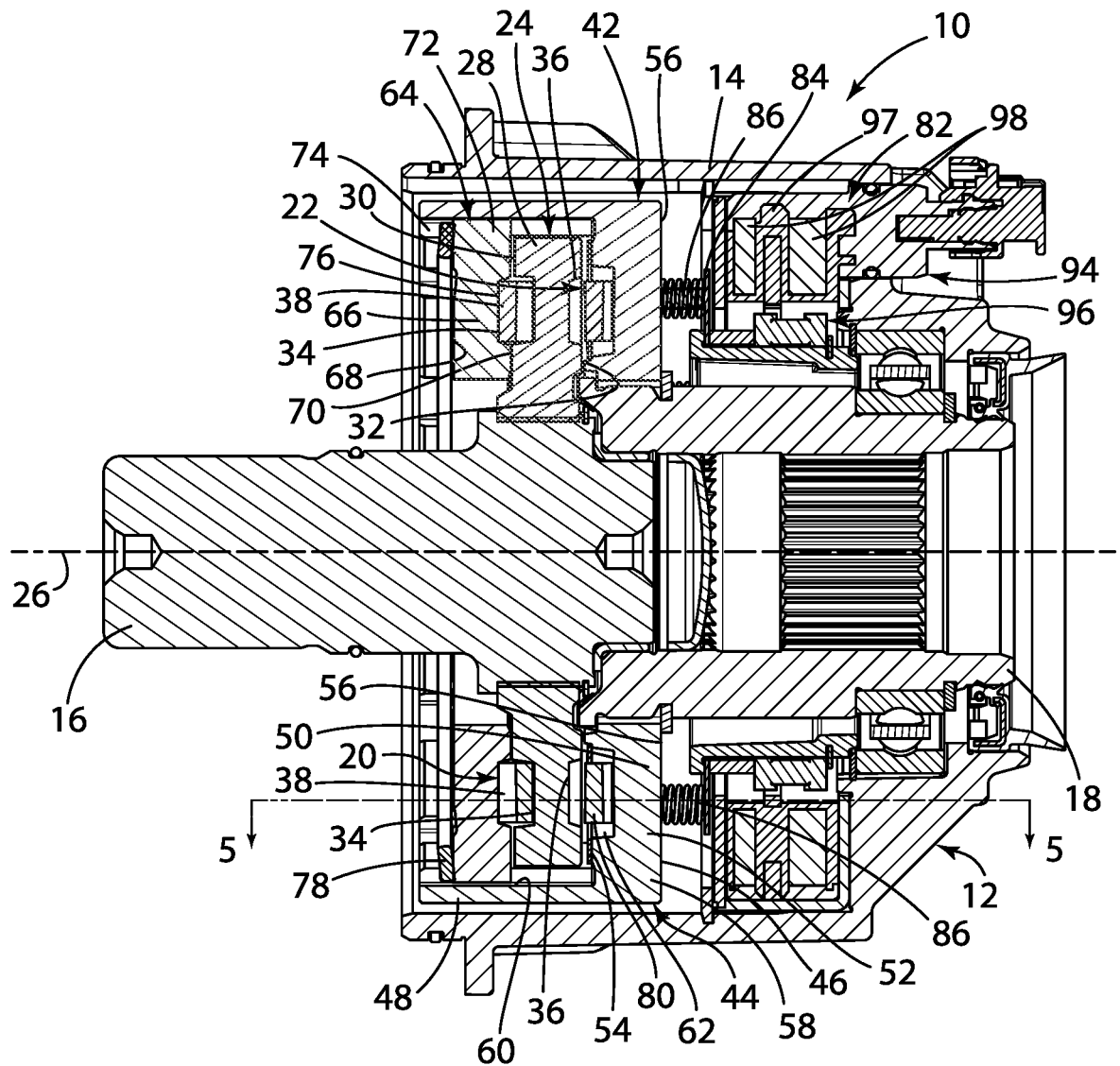
FIG. 1 is a schematic sectional side view of a clutch assembly.
Figure 2A:
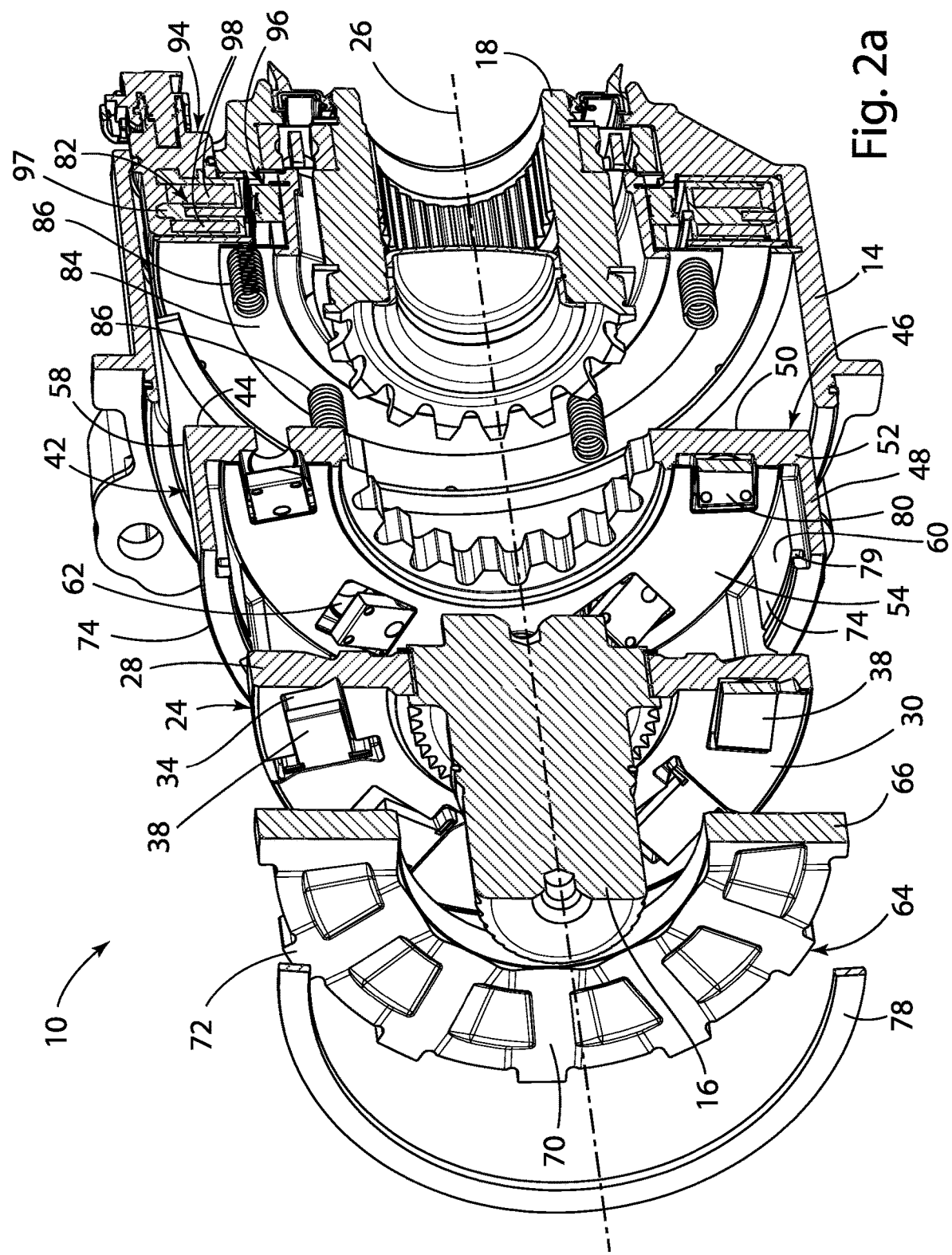
FIG. 2a is a schematic, exploded, perspective view of a portion of the clutch assembly viewed from the left.
Figure 2B:
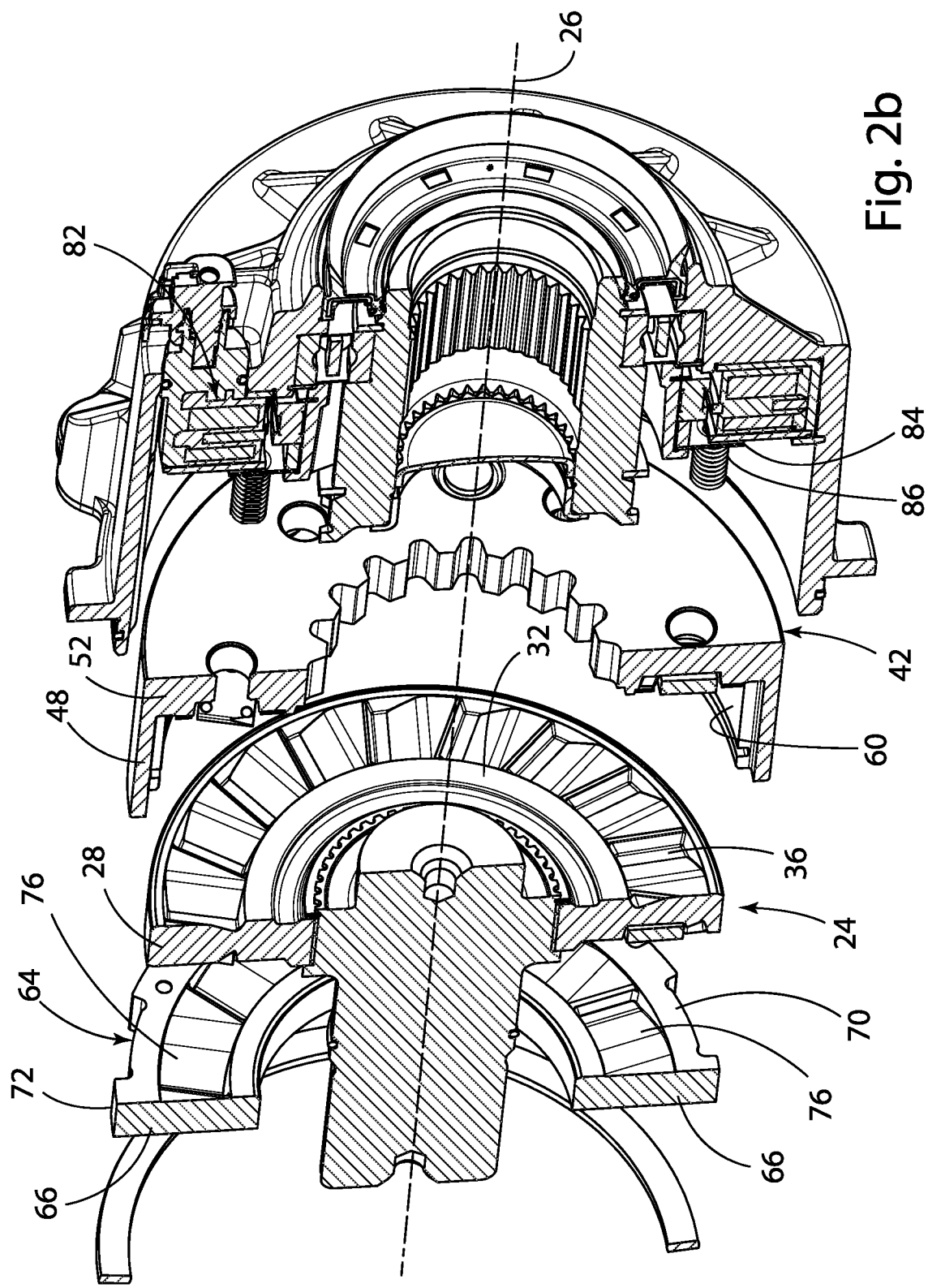
FIG. 2b is a schematic, exploded, perspective view of a portion of the clutch assembly viewed from the right.

The following description of the preferred embodiment(s) is merely exemplary in nature and is in no way intended to limit the invention, its application, or its uses.

The drawings show one example of a clutch assembly or module, generally seen at 10, illustrated as a hub clutch or wheel disconnect 12 that provides a mechanical engagement housed in, or adjacent to, the hub of a vehicle wheel. The clutch assembly or module 10 functions as a releasable torque transmitting mechanism that provides a mechanical engagement between mating parts. While illustrated as a hub clutch or wheel disconnect 12, the clutch assembly or module 10 may be used with other mechanisms.

The clutch assembly or module 10 includes one-way clutches. One type of a "one-way" or "overrunning" clutch produces a drive connection or engaged state between rotating components when their relative rotation is in one direction, overruns when relative rotation is in the opposite direction, and overruns when their relative rotation is in the same direction and the driven member rotates faster than the drive member. The overrunning clutch operates when the drive or input member rotates slower than the driven or output member. The direction of driving and overrunning in the opposite direction depends upon the direction of rotation of the driving member.

In the disclosed example, the clutch assembly or module 10 includes a passive clutch assembly, a first one-way clutch assembly 20, and an active clutch assembly or a controllable disconnectable clutch, a second one-way clutch assembly 22. In one example, the active clutch assembly or a controllable disconnectable clutch is a dynamic or dynamically controllable clutch. A dynamic controllable clutch refers to a controllable or selectable one-way clutch acting between two rotating components; for example, both races are rotatable.

The clutch assembly or module 10 includes a housing 14, an input member, shown as a drive or input shaft 16, and an output member, shown as a driven or output shaft 18. The clutch assembly or module 10 includes a first one-way clutch assembly, seen generally at 20, and a second one-way clutch assembly, seen generally at 22.

The first one-way clutch assembly 20 transfers torque from a power source or drive motor, motor side (not shown) through the input shaft 16 to the wheel side (not shown), through the output shaft in one direction only, typically forward—corresponding to forward vehicle movement or motion. Because the first one-way clutch assembly 20 transfers torque in one direction only, from the motor side to the wheel side, no torque is transferred by or through the first one-way clutch assembly 20 from the wheel side to the motor side. The second one-way clutch assembly 22 provides a mechanism for transferring torque opposite to the direction of torque transfer of the first one-way clutch assembly 20 and for transferring the torque from the wheel side to the motor side.

The first one-way clutch 20 includes a first component, seen generally at 24, connected to the drive or input shaft 16. The first component 24 can rotate in either a clockwise or counterclockwise direction about a rotational axis 26 of the clutch assembly or module 10. The first component 24 includes a disc-shaped member or plate 28 extending radially from the rotational axis 26. The disc-shaped member or plate 28 has first and second generally planar, radially extending opposing sidewalls 30, 32. The first sidewall 30 faces the drive or input side of the clutch assembly or module 10, and the second sidewall 32 faces the driven or output side of the clutch assembly or module 10. The first sidewall 30 includes a plurality of pockets 34 and the second sidewall 32 includes a plurality of notches 36. The first one-way clutch 20 includes a locking element, for example, a strut 38, in the pocket 34 of the disc-shaped member or plate 28 of the first component 24. The strut 38 is biased outwardly, pushed out of the pocket by a spring 40. The term locking element refers to a member or element capable of producing a mechanical connection. Engaged or connected means a mechanical connection exists between two components. Nonengaged or disconnected means no mechanical connection exists between the two components.

The first one-way clutch 20 also includes a second component, seen generally at 42. The second component 42 is connected to the driven or output shaft 18. The second component 42 can rotate in a clockwise or counterclockwise direction about a rotational axis 26 of the clutch assembly or module 10. The second component 42 includes a cup-shaped member 44 connected to the driven or output shaft 18. The cup-shaped member 44 includes a body 46 having an axially extending annular or cylindrical wall 48 and a radially extending base 50 formed by a disc-shaped member or plate 52. The annular or cylindrical wall 48 extends axially in the direction of the rotational axis 26, with the disc-shaped member or plate 52 extending radially outward from the rotational axis 26. The disc-shaped member or plate 52 has first and second generally planar, radially extending opposing sidewalls 54, 56. An outer peripheral end 58 of the disc-shaped member or plate 52 terminates at and joins with or connects to the annular or cylindrical wall 48. While the annular or cylindrical wall 48 and base 50 are shown as an integral, one-piece member, the two could also be formed in multiple mechanically joined pieces, for example, with a splined connection. The cup-shaped member 44 includes an open end and defines an open interior space.

The first one-way clutch 20 further includes a third component 64. The third component 64 includes a disc-shaped member or plate 66 extending radially from the rotational axis 26. The disc-shaped member or plate 66 has first and second generally planar, radially extending opposing sidewalls 68, 70. The disc-shaped member or plate 66 of the third component 64 disposed within the open interior space of the cup-shaped member 44 of the second component 42. The disc-shaped member or plate 66 connects to the inner circumferential surface 60 of the annular or cylindrical wall 48. The disc-shaped member or plate 66 of the third component 64 includes a plurality of radially extending projections, for example, splines 72. The splines 72 interlock with radially inwardly extending projections, for example, splines 74, on the inner circumferential surface 60 of the annular or cylindrical wall 48 of the cup-shaped member 44. Because the third component 64 is mechanically interlocked with the second component 42, via the splined connection 72, 74, the third component 64 rotates with the second component 42. The second sidewall 70 of the disc-shaped member or plate 66 includes a plurality of notches 76. The second sidewall 70 of the member or plate 66 of the third component 64 faces the first sidewall 30 of the disc-shaped member or plate 28 of the first component 24. The third component 64 is held in place in the open interior space of the cup-shaped member 44 by a split or snap ring 78 situated in a groove 79 in the inner circumferential surface 60 of the annular or cylindrical wall 48.

Figure 3:
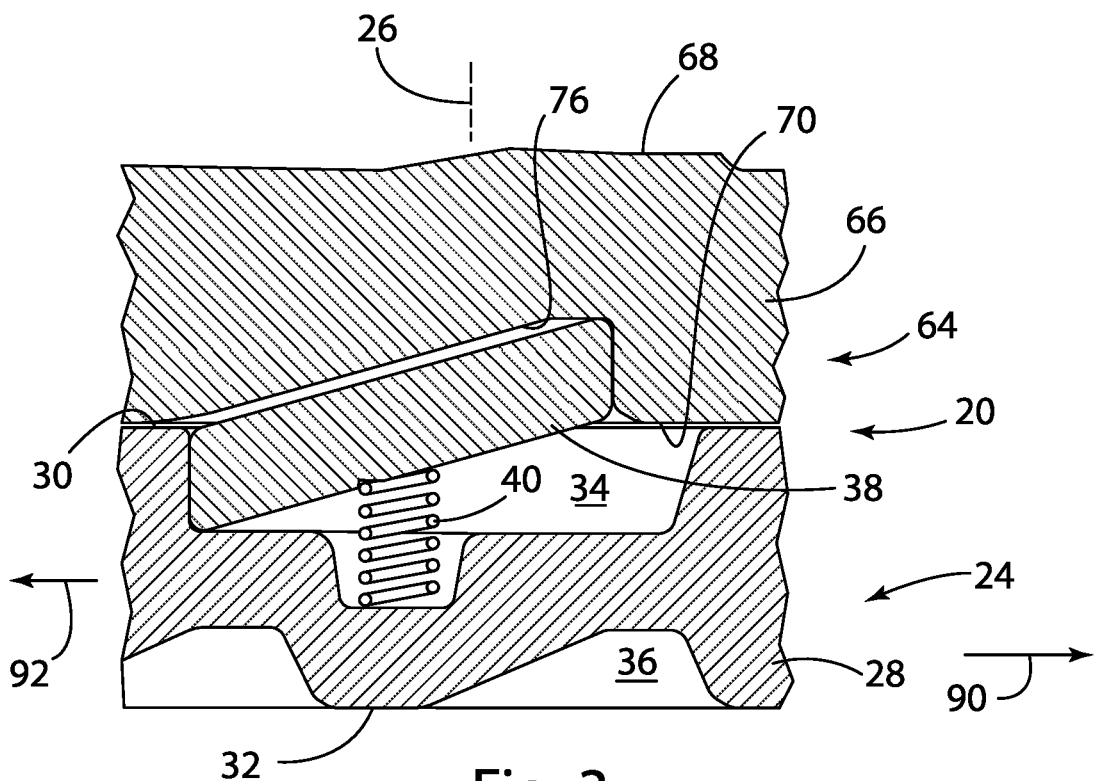
FIG. 3 is an enlarged, schematic sectional view of a portion of the clutch assembly in a connected state.

The term locking element refers to a member or element capable of producing a mechanical connection. The first one-way clutch 20 may be referred to a passive one-way clutch or passive strut assembly because it includes a passive or uncontrolled locking element, for example, the strut 38, in the pocket 34 of the disc-shaped member or plate 28 of the first component 24. The passive one-way clutch assembly 20 is on the input shaft 16 side, and the strut 38 connects to and rotates with the input shaft 16. As illustrated in FIG. 3, the strut 38 is continuously biased outwardly by a spring 40. The first one-way clutch 20 is passive because the strut 38 of the first-one-way clutch 20 is not controlled. Depending on the direction and speed of rotation of the components, the first one-way clutch 20 either engages or overruns. In one direction, it engages and overruns; in the other, it overruns. In an overrun condition the components may turn freely in at least one direction with respect to one another.

FIG. 3 shows the spring 40 constantly urging the strut 38 outward from the pocket 34 in the first sidewall 30 of the disc-shaped member or plate 28. Because the spring 40 constantly urges the strut 38 outward from the pocket 34, the strut 38 is continuously deployed, and the first one-way clutch 20 is always in an on position. Depending upon the direction and speed of rotation, the strut 38, in the pocket 34 of the first sidewall 30 of the disc-shaped member or plate 28, engages the notch 76 of the disc-shaped member or plate 66 of the third component 64, mechanically connecting the first component 24 to the third component 64 in one direction of rotation. Engagement by the strut 38 in the pocket 34 of the disc-shaped member or plate 28 of the first component 24 with a notch 76 in the disc-shaped member or plate 66 of the third component 64 transfers torque and prevents relative rotation between the first and third components 24, 64 in one direction. The first component 24, transfers torque to the third component 64 in one direction only; while allowing relative rotation, overrun, between the first and third components 24, 64 in the opposite direction. During overrun, the strut 38 is pushed out of the notch 76 in the disc-shaped member or plate 66 and back into the pocket 34 of the disc-shaped member or plate 28 by the sloped surface of the notch 76 and side surface or sidewall 70 of the disc-shaped member or plate 66.

Figure 4:
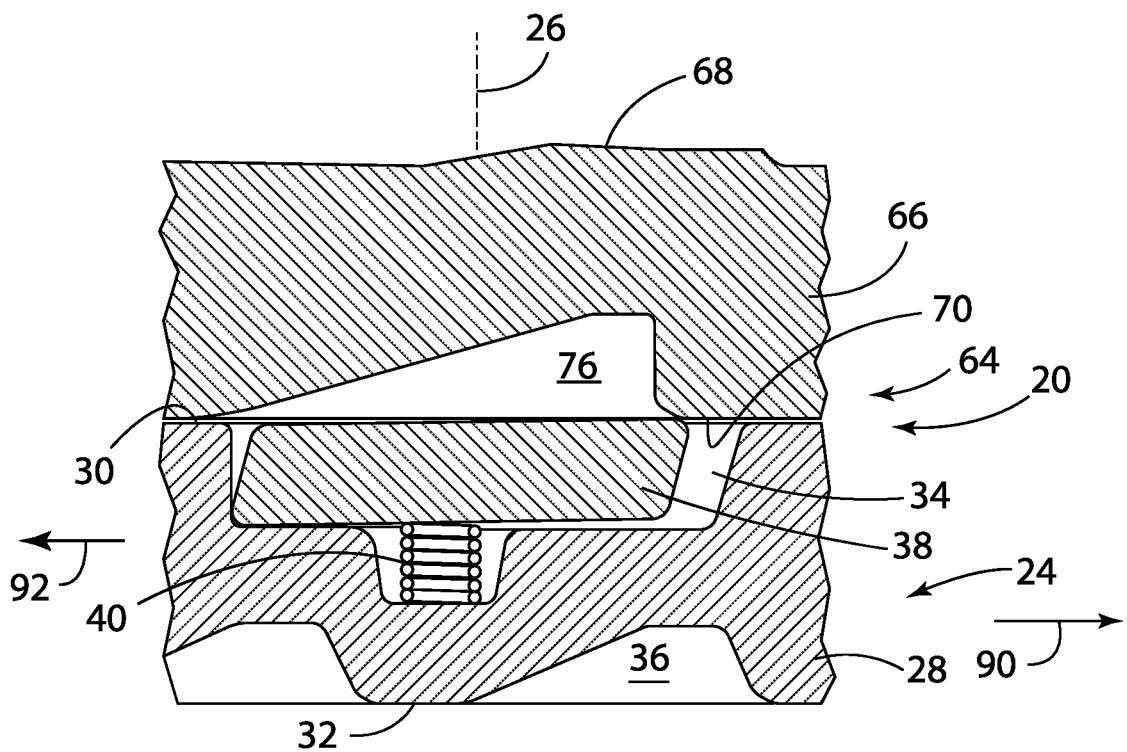
FIG. 4 is an enlarged, schematic sectional view of a portion of the clutch assembly in an overrun or disconnected state.

FIGS. 3 and 4 show the operation of the passive one-way clutch 20. FIG. 3 shows a connected state of the first one-way clutch 20, which occurs when the rotational speed $\omega_{28}$ of the disc-shaped member or plate 28 of the first component 24 is greater than the rotational speed $\omega_{66}$ of the disc-shaped member or plate 66 of the third component 64 in the direction of the arrow 90 in FIG. 3. As shown in FIG. 3, the disc-shaped member or plate 28 of the first component 24 drives the disc-shaped member or plate 66 of the third component 64 and passively connects the two members or plates 28, 66. With such a passive system, the drive or input torque from the drive or input shaft is always transferred from the first component 24 to the third component 64 in one direction whenever the rotational speed $\omega_{24}$ of the first component 24 is greater than the rotation speed $\omega_{64}$ of the third component 64.

FIG. 4 shows the first one-way clutch 20 in an overrun condition or state, which may occur in two conditions. In the first condition, the first one-way clutch 20 overruns when the disc-shaped or member plate 66 of the third component 64 has a greater rotational speed $\omega_{66}$ than the rotational speed $\omega_{28}$ of the disc-shaped member or plate 28 of the first component 24 in the direction of the arrow 90. The overrun state effectively or passively disconnecting the two plates 28, 66 and correspondingly disconnecting the first and third components 24, 64. When the disc-shaped member or plate 66 of the third component 64 rotates faster than the disc-shaped member or plate 28 of the first component 24, it acts against the spring 40 and presses the strut 38 into the pocket 34 in the disc-shaped member or plate 28. In the second condition, the first one-way clutch 20 overruns when the first component 24 reverses rotation, i.e., rotates in the direction opposite of rotation of the third component 64, a direction opposite to the direction of the arrow 92. As illustrated, the strut 38, associated with the first component 24, transfers torque in only one direction. The strut 38 engages the third component 64, transfers torque in only one direction, and overruns in the opposite direction. In an overrun condition, the disc-shaped member or plate 66 of the third component 64 presses the strut 38 into the pocket 34 of the disc-shaped member or plate 28 when the disc-shaped member or plate 28 rotates in a direction opposite to the direction of torque transfer.

The engagement by one or more of the struts 38 in the pockets 34 of the disc-shaped member or plate 28 of the first component 24 with corresponding notches 76 in the member or plate 66 of the third component 64 prevents relative rotation between the first and third components 24, 64 in one direction. The first component 24 transfers torque to the third component 64 in one direction only; while allowing relative rotation between the first and third components 24, 64 in the opposite direction.

The second one-way clutch 22 is a dynamic, controllable clutch. The dynamic, controllable clutch operates such that torque imposition results from engagement or nonengagement of locking elements, for example, the struts 80 associated with the second one-way clutch 22. The second one-way clutch 22 may also be referred to as an active strut assembly or an active one-way clutch because the strut 80 is controlled. In an active strut assembly or active one-way clutch, an actuator 82 moves a locking member, such as the strut 80 in the pocket 62 of the disc-shaped member or plate 52 of the second component 42, between a non-deployed position, the strut 80 in the pocket 62 and a deployed position, the strut 80 extending outwardly from the pocket 62 and beyond the first sidewall 54 of the disc-shaped member or plate 52. In the deployed position, the strut 80 engages a notch 36 in the second sidewall 32 of the disc-shaped member or plate 28 of the first component 24. The locking member or strut 80 moves between a deployed or locked position and a non-deployed or unlocked position.

In one embodiment, the actuator 82 is a linear actuator acting on a spring plate 84. The spring plate 84 connects to a spring 86. The spring 86 engages the strut 80. Axial movement of the spring plate 84 compresses the spring 86. The spring 86 acts on the strut 80 and overcomes the force of the return spring 88, causing the strut 80 to extend out of the pocket 62 and past the first sidewall 70 of the disc-shaped member or plate 52 of the second component 42.

The actuator device 82 includes a stator structure 94 and a translator structure 96. The stator structure 94 is connected to the housing (not shown), remains stationary, and does not rotate. The translator structure 96 rotates with the output shaft 18 and rotates about the rotational axis 26. It is supported for translational movement relative to the stator structure 94 along the rotational axis 26 between the first and second axial end positions, corresponding to different operating modes of the clutch assembly or module 10. The stator structure 94 includes a ferromagnetic housing 97 having spaced apart fingers with the electromagnetically inductive coils 98 housed between adjacent fingers. In one example, the stator structure 94 has two electromagnetically inductive coils 98 to create a magnetic flux when one or both electromagnetically inductive coils 98 are energized. The stator structure 94 applies a first magnetic control force to the translator structure 96 one way when the electromagnetically inductive coils 98 are energized to cause the translator structure 96 to move along the rotational axis 26. The translator structure 96 reacts to the magnetic control force by moving the spring plate 84 and corresponding spring 86 along the rotational axis 26. By reversing the current direction in the electromagnetically inductive coils 98, the translator structure 96 causes the spring plate 84 and corresponding spring 86 to move in the opposite direction along the rotational axis 26.

Figure 5:
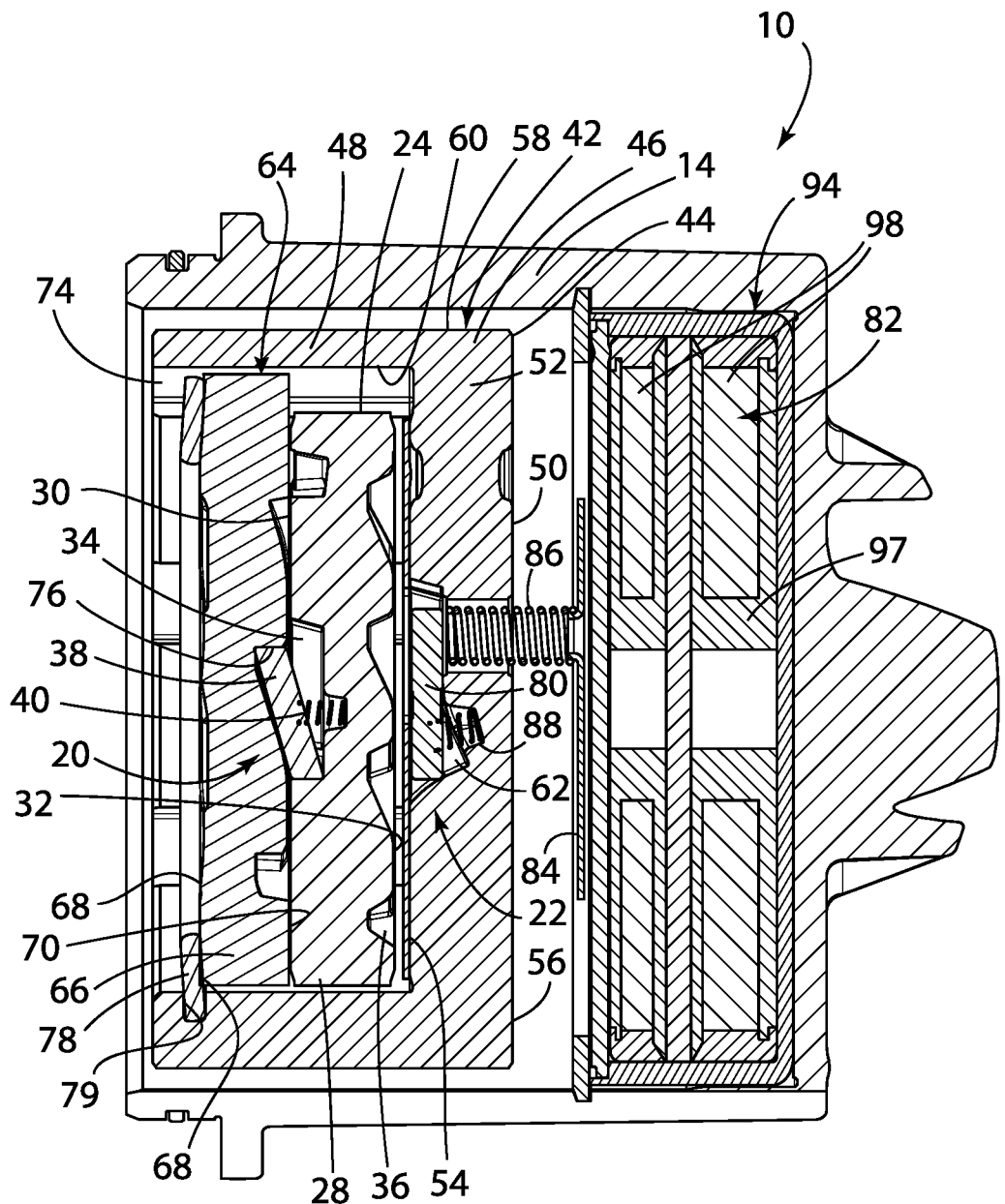
FIG. 5 is a schematic sectional view of a portion of the clutch assembly illustrating a 0/1 functional state or mode taken along lines 5-5 of FIG. 1.
Figure 6:
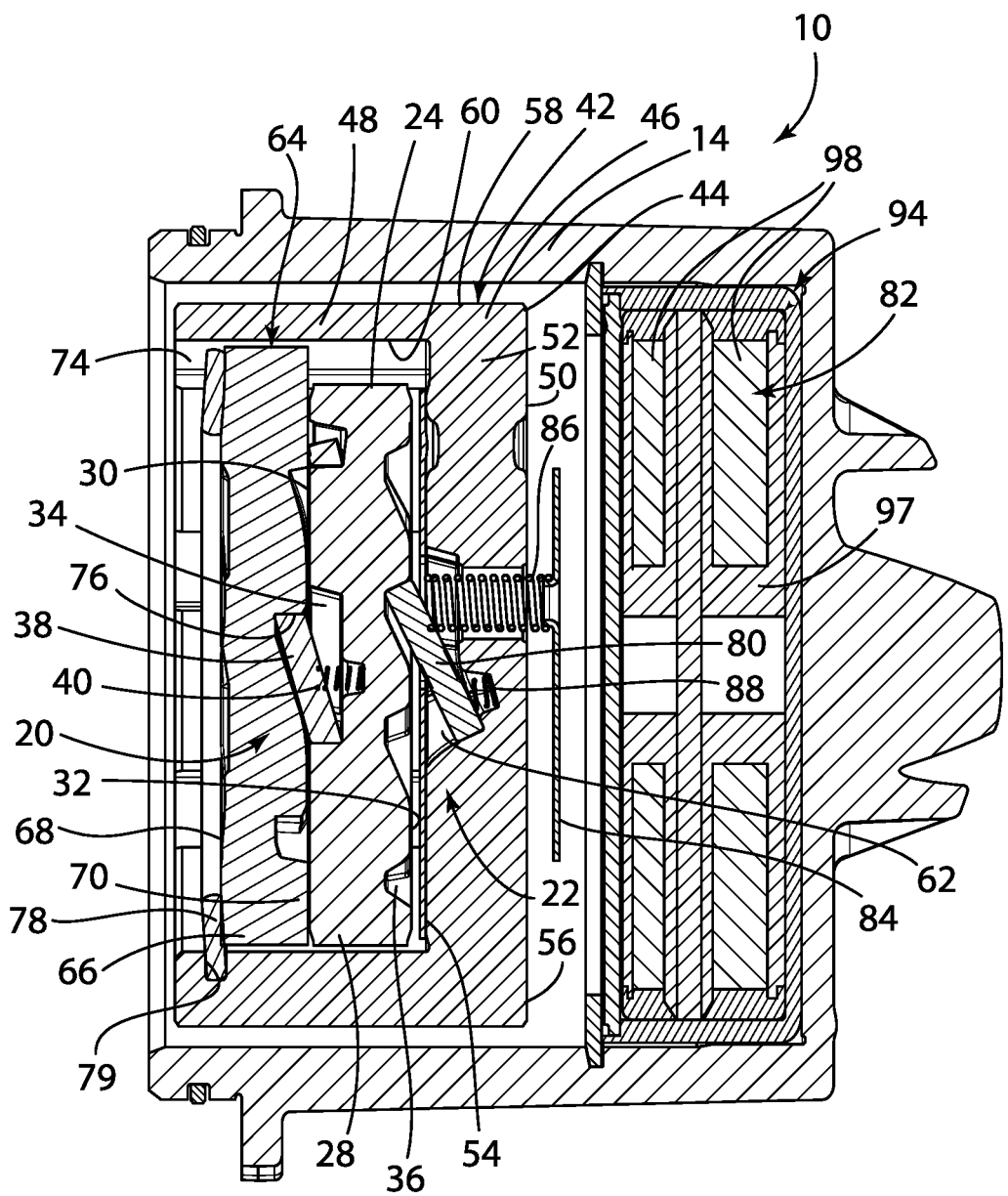
FIG. 6 is a schematic sectional view of a portion of the clutch assembly similar to FIG. 5, illustrating a 1/1 functional state or mode.

FIGS. 5 and 6 show the multiple connected states or modes of torque transfer and rotation of the clutch assembly or module 10. The direction of rotation of the drive or input shaft 16 and the corresponding first component 24 determines the direction of torque imposition, the direction of the output shaft 18, and a direction of movement—forward or reverse. As for the first and second one-way clutches 20, 22, the connected state or mode can be expressed in or by an x/x nomenclature. Wherein the x on the left side of the slash signifies the existence or lack of torque imposition by the second one-way clutch 22, and the x to the right of the slash signifies the existence or lack of torque imposition by the first one-way clutch. As used herein, a numeral one (1) on the right side of the slash indicates the first one-way clutch 20 is engaged and imposing torque in one direction and overrunning in the opposite direction. A numeral zero (0) on the right side of the slash indicates no engagement and no torque imposition in either direction. Because the first one-way clutch 20 is a passive, one-way clutch, the strut 38 is constantly deployed—urged outward from the pocket 34. The strut 38, and correspondingly the first one-way clutch 20, is always engaged, imposing torque in one direction and overrunning in the opposite direction. In the disclosed example, the first one-way clutch 20 imposes torque in the forward direction, corresponding to forward vehicle movement or motion, and overruns in rearward or reverse movement or motion. Forward and reverse relate to the direction of vehicle movement.

The second one-way clutch 22 uses the same convention, either a one (1), indicating the second one-way clutch 22 is engaged and imposing torque in one direction and overrunning in the opposite direction, or a zero (0), indicating the second one-way clutch 22 is disengaged and imposes no torque in either direction. Because the second one-way clutch 22 is an active one-way clutch, it moves between engaged (1) and disengaged (0) states or modes. When the second one-way clutch 20 is engaged, the strut 80 extends from the pocket 62, imposes torque in one direction, and overruns in the opposite direction. In the disclosed example, the second one-way clutch 22 imposes torque in the rearward direction, corresponding to rearward or reverse movement or motion, and overruns in relation to forward movement or motion. When the second one-way clutch 22 is disengaged, the strut 80 remains in the pocket 62, and no torque is imposed in either direction.

FIG. 1 shows the drive or input shaft 16 connected to the disc-shaped member or plate 28 of the first component 24. The drive or input shaft 16 connects to a power source, for example, a drive motor (not shown.) FIGS. 5-9 show the locking element or strut 38 of the passive or first one-way clutch assembly 20 in the pocket 34 in the disc-shaped member or plate 28, which connects to the drive or input shaft 16. The strut 38 is on the motor, input, or input shaft side and rotates with the drive or input shaft 16. The strut 38 transfers the torque from the input shaft 16 to the output shaft 18. The locking element or strut 80 of the second one-way clutch assembly 22 is in the pocket 62 of the disc-shaped member or plate 52 connected to the driven or output shaft 18. The strut 80 is on the wheel or output side and rotates with the driven or output shaft 18. As illustrated, the disc-shaped member or plate 28 includes pockets 34 and struts 38 on a side surface or sidewall 30 thereof and notches 36 in the other side surface or sidewall 32. The passive or non-controlled strut 38 rotates with, in the same direction and rotational speed as, the drive or input shaft. It is on the motor side, not the wheel side.

Figure 7:
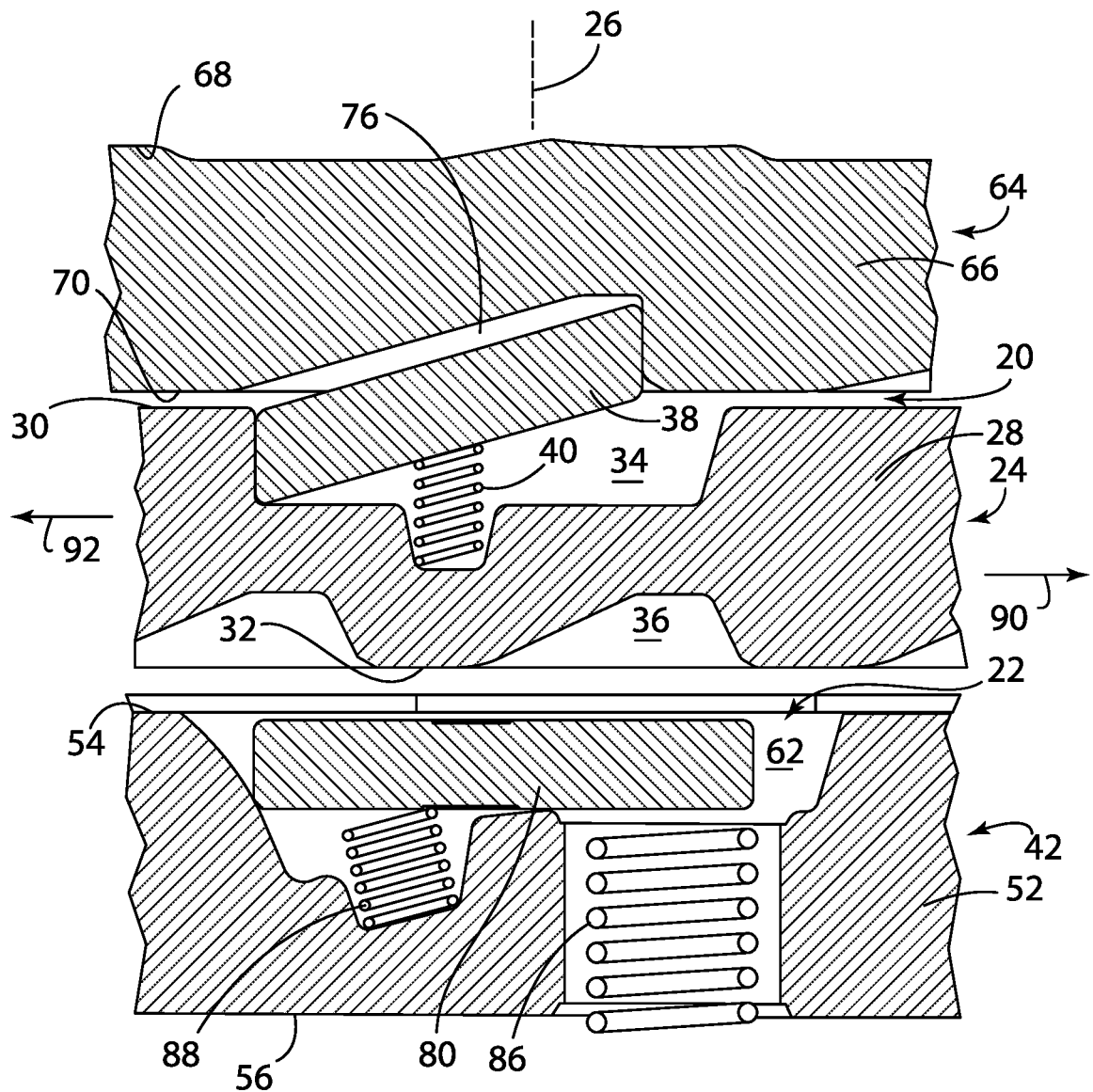
FIG. 7 is an enlarged, schematic sectional view of a portion of the clutch assembly illustrating the 0/1 functional state or mode.

FIG. 7 shows the second one-way clutch 22 in a non-deployed position, with the strut 80 biased inwardly into the pocket 62 by a return spring 88. The first component 24 and the second component 42 are in a freewheel condition, with the strut 80 in a non-deployed position. A freewheel condition exists when the strut 80 is not active; that is, when the strut 80 is disengaged or not deployed. In this condition, the respective components may rotate independently in either direction.

Figure 8:
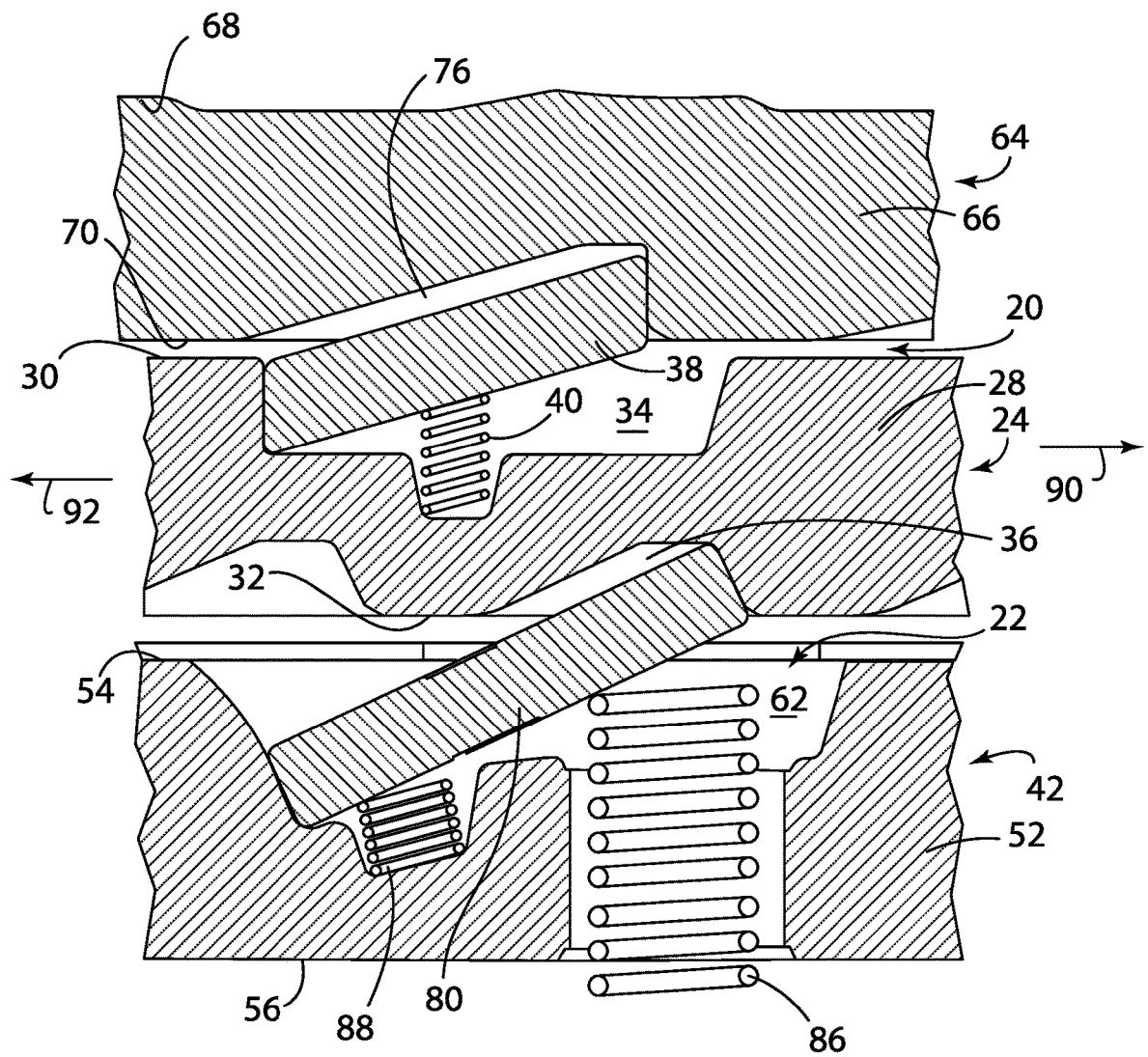
FIG. 8 is an enlarged, schematic sectional view of a portion of the clutch assembly illustrating the 1/1 functional state or mode.

FIG. 8 shows that when the actuator 82 of the second one-way clutch 22 moves the spring 86 and the strut 80 to a deployed position, the second one-way clutch 22 prevents relative rotation between the first and second components 24, 42 in one direction. When the second one-way clutch 22 is engaged, the first component 24 transfers torque to the second component 42 in one direction only; while allowing relative rotation between the first and second components 24, 42 in the opposite direction. In the engaged position, the second one-way clutch 22 also allows relative displacement between the first component 24 and the second component 42 in an overrun or opposite direction of rotation. The strut 80 associated with the second one-way clutch 22 is capable of an overrunning mode.

Figure 9:
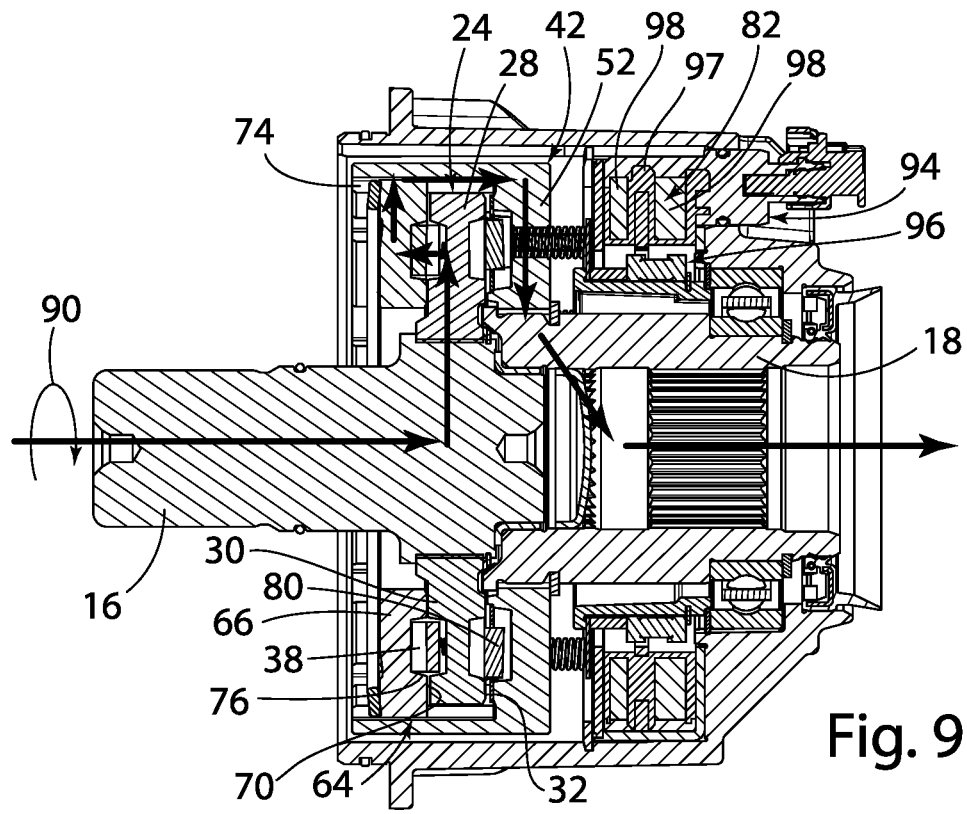
FIG. 9 is a schematic sectional view illustrating a power flow path for forward torque.

FIG. 9 illustrates the torque path 91 from the motor through the drive or input shaft 16 to the driven or output shaft 18 and ultimately a vehicle wheel in the 0/1 state or mode. As illustrated, the motor rotates the drive or input shaft 16, which correspondingly rotates the disc-shaped member or plate 28 of the first component 24 in the forward direction shown by the arrow 90. The arrow 90 represents rotation in the clockwise direction. Because the first one-way clutch 20 is a connected state, the strut 38 in the pocket 34 in the disc-shaped member or plate 28 of the first component 24 is biased outwardly of the first sidewall 30, wherein it engages the notch 76 in the second sidewall 70 of the disc-shaped member or plate 66 of the third component 64 whenever the disc-shaped member or 28 rotates at a speed greater than the speed of the disc-shaped member or plate 66. Based on relative rotation speed, the first component 24 transmits torque to the third component 64. The torque from the third component 64 is transferred from the third component 64 through the direct or splined connection 72, 74 to the second component 42, including the disc-shaped member or plate 52. As illustrated, the second component 42, including the disc-shaped member or plate 52, connects to the driven or output shaft 18. In one example, the second component 42 is connected to a vehicle wheel or wheel hub shaft. In the exemplary embodiment, when the driven or input shaft 16 rotates in the clockwise or forward direction, arrow 90, it transfers forward direction torque to the driven or output shaft 18 and a corresponding vehicle wheel along the torque path shown in FIG. 9.

Because the first one-way clutch 20 only transmits torque in the forward direction, the second one-way clutch 22 is used to transmit torque in the reverse direction. In the disclosed exemplary example, when the drive or input shaft 16 rotates in the reverse direction shown by the arrow 92, the disc-shaped member or plate 28 of the first component 24 also rotates in a reverse direction, creating an overrunning condition between the disc-shaped member or plate 28 of the first component 24 and the disc-shaped member or plate 66 of the third component 64. In this condition, the disc-shaped member or plate 28 of the first component 24 transfers no torque in the reverse direction to the disc-shaped member or plate 66 of the third component 64; consequently, no torque is transmitted in the reverse direction to the driven or output shaft 18 and corresponding vehicle wheel.

Figure 10:
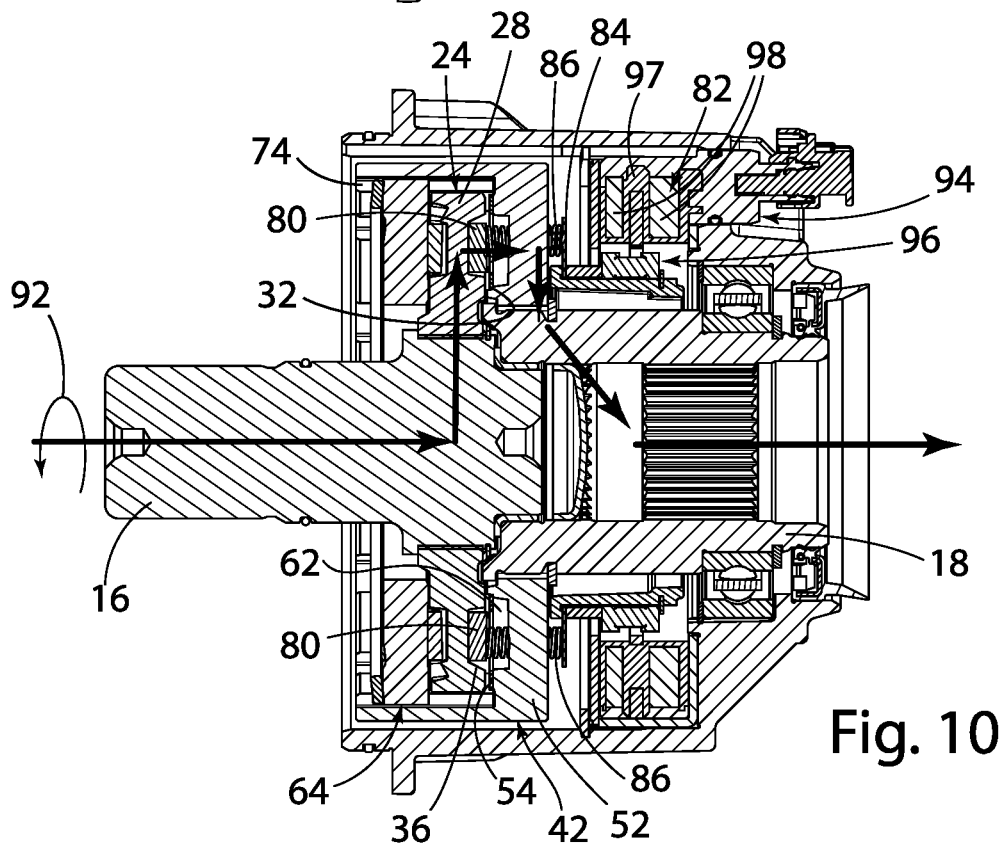
FIG. 10 is a schematic sectional view illustrating a power flow path for reverse torque.

FIG. 10 illustrates the torque path 93 from the motor through the drive or input shaft 16 in the 1/1 state shown in FIG. 7. The second one-way clutch 22 transmits torque in the reverse direction. The arrow 92 represents rotation in the clockwise direction. To transmit torque in the reverse direction from the drive or input shaft 16 to the driven or output shaft 18, the actuator 82 operates to apply force through the spring plate 84 and spring 86 to the strut 80 in the pocket 62 of the disc-shaped member or plate 52 of the second component 42. The force applied by the spring 86 overcomes the force applied by the return spring 88 on the strut 80 and urges the strut 80 out of the pocket 62 and past the first sidewall 54 of the member or plate 52 of the second component 42. As illustrated in FIG. 10, when the disc-shaped member or plate 28 of the first component 24 rotates in the counterclockwise or reverse direction, shown by the arrow 92, the strut 80 engages the notch 36 in the second sidewall 32 of the disc-shaped member or plate 28 and correspondingly transmits torque to the disc-shaped member or plate 52 of the second component 42 and correspondingly to the driven or output shaft 18 whereby the vehicle travels in reverse.

Depending upon the position, engaged or disengaged, of the second one-way clutch 22 multiple modes of torque transfer and rotation can be achieved. The direction of rotation, forward or reverse, is based on the direction of rotation of the drive or input shaft 16 and corresponding first component 24. The input torque travels from the drive or input shaft 16 through the first component 24 and through one or both of the second or third components 42, 64, as shown in the power or torque transmission paths illustrated in FIGS. 9, 10.

In the disclosed example, the clutch assembly or module 10 may be used as an axle/driveline disconnect with a passively engaging forward element. The passively engaging forward element, first one-way clutch 20, enables the system to overrun when the wheel exceeds the input motor/gear speed in the forward direction; for example, when the input or drive motor is in an off condition—not providing drive torque. The first one-way clutch 20 also enables power or torque to be put through the system resulting in a forward vehicle direction without waiting for a controllable element, for example, an active clutch, to turn on, significantly reducing the torque delay. When the controllable system is turned on, the second one-way clutch 22 engages; because the second one-way clutch 22 is also a one-way clutch that overruns during forward vehicle motion, the clutch assembly or module 10 transfers forward torque. Additionally, the second one-way clutch 22 allows the clutch assembly or module 10 to transfer reverse torque for reverse vehicle motion enabling the vehicle to conduct regeneration or go into reverse on actuation/demand. When the clutch assembly or module 10 transfers reverse torque, the first one-way clutch 20 overruns.

A passive one-way clutch always engages depending upon the direction and speed of rotation. In one embodiment, the first one-way clutch 20 is a passive one-way clutch, and the second one-way clutch 22 is an active or dynamic one-way clutch. An active or dynamic one-way clutch operates in an on/off manner—a deployed/non-deployed locking member or strut position. The locking member moves between a deployed or locked position and a non-deployed or unlocked position.

Figure 11:
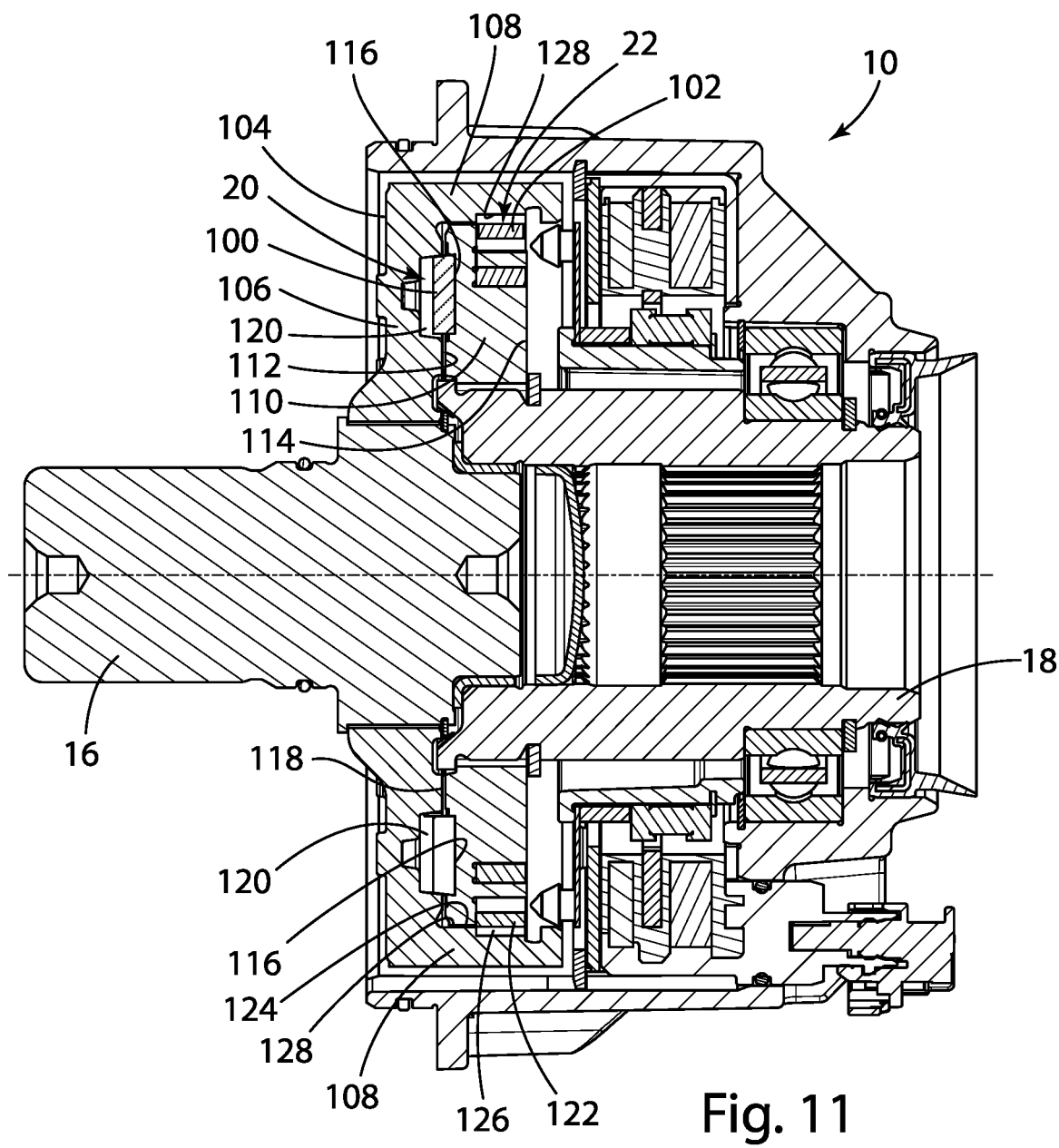
FIG. 11 is a schematic sectional side view illustrating an additional embodiment of the clutch assembly, including radial and axial strut positions.

FIG. 11 illustrates an additional embodiment of the clutch assembly or module 10, showing the first one-way clutch 20 in a planar position and the second one-way clutch 22 in a radial position.

For example, FIG. 11 illustrates an alternative embodiment of the clutch assembly or module 10. The first one-way clutch 20 includes a passive planar strut 100, and the second one-way clutch 22 includes a dynamic radial strut 102. The alternative embodiment of the clutch assembly or module 10 includes a first component, shown in FIG. 11 as a cup-shaped member 104 connected to the input shaft 16. The cup-shaped member includes a radially extending disc-shaped member or plate 106 and an axially extending disc-shaped wall 108. The cup-shaped member 104 includes an inner cavity. The alternative embodiment of the clutch assembly or module 10 includes a second component, shown in FIG. 11 as a disc-shaped member or plate 110. The disc-shaped member or plate 110 has first and second side surfaces 112, 114. The first side surface has a notch 116. The disc-shaped member or plate 110 is disposed in the inner cavity of the cup-shaped member 104, with the first side surface 112 of the disc-shaped member or plate 110 located adjacent to the first side surface 118 of the disc-shaped member or plate 106. The first side surface 118 of the disc-shaped member or plate 106 includes the strut 100 in a pocket 120, similar to that shown in the first one-way clutch assembly 20. As disclosed, the strut 100 is a passive strut—the strut spring maintains the strut 120 in an axially outward position, above the first side surface 118 of the disc-shaped member plate 106, wherein it either overruns or engages the notch 116 in the first side surface 112 of the disc-shaped member plate 110.

The strut 102 of the second one-way clutch 22 is in a pocket 122 placed in the outward radial, peripheral surface 124 of the disc-shaped member or plate 110. The strut 102 engages a notch 126 on a radial, inner surface 128 of the disc-shaped wall 108 of the cup-shaped member 104.

The passive and active struts of first and second one-way clutches 20, 22 can be placed in various orientations. Both may be placed or oriented to engage radial surfaces, or one may engage a planar surface while the other engages a radial surface. For example, the passive planar strut 100 of FIG. 11 can be oriented radially on the outer peripheral surface 124 of the disc-shaped member plate 110, and the active radial strut 102 can be orientated planar on the disc-shaped member plate 106 of the cup-shaped member 104.

The description of the invention is merely exemplary in nature. Thus, variations that do not depart from the gist of the invention are intended to be within the scope of the invention. Such variations are not to be regarded as a departure from the spirit and scope of the invention.

What is claimed is:

1. A clutch assembly comprising:
a first shaft rotatable about a rotational axis;
a second shaft rotatable about the rotational axis;
a first component directly connected to the first shaft;
a second component directly connected to the second shaft;
a third component directly connected to the second component wherein the third component does not directly contact either of the first shaft and the second shaft;
a passive one-way clutch between the first component and the third component; and
an active one-way clutch between the first component and the second component, the active one-way clutch including an electromagnetic actuator including a stator having at least one inductive coil and a translator, the at least one inductive coil acts on the translator wherein the translator moves axially in the direction of the rotational axis.

2. The clutch assembly of claim 1 wherein:
the first component includes a first surface and a second surface;
the second component includes a first surface;
the third component includes a first surface;
the passive one-way clutch coupling the first surface of the first component to the first surface of the third component; and
the active one-way clutch coupling the second surface of the first component in the first surface of the second component.

3. The clutch assembly of claim 2 wherein:
the first component is disposed between the first surface of the third component and the first surface of the second component.

4. The clutch assembly of claim 1 wherein:
the first component includes a disc-shaped member directly connected to and extending radially outward from the first shaft; and
the second component includes a disc-shaped member directly connected to and extending radially outward from the second shaft; and
the third component includes a disc-shaped member directly connected to the second component and extending radially inward toward the first shaft wherein the disc-shaped member of the second component and the disc-shaped member of the third component are axially spaced with the disc-shaped member of the first component positioned between the disc-shaped members of the second component and the third component.

5. The clutch assembly of claim 1 wherein:
the passive one-way clutch includes a pocket in a first surface of the first component and a locking element extending out of the pocket and past the first surface of the first component and engaging the first surface of the third component; and
the active one-way clutch includes a locking element deployable between a second surface of the first component and the first surface of the second component.

6. The clutch assembly of claim 5 wherein:
the first surface of the third component includes a plurality of notches; and
the second surface of the first component includes a plurality of notches.

7. The clutch assembly of claim 1 wherein:
the passive one-way clutch includes a locking element, the locking element engaging a notch in the third component; and
the active one-way clutch includes a locking element, the locking element engaging a notch in the first component.

8. A clutch assembly comprising:
an input shaft, rotatable about a first shaft rotational axis, receiving an input from a motor;
an output shaft, rotatable about a second shaft rotational axis, transmitting power to a vehicle wheel;
a first component connected to and rotating with the input shaft;
a second component connected to and rotating with the output shaft;
a passive one-way clutch between the first component and the second component;
an active one-way clutch between the first component and the second component;
the passive one-way clutch including the first component having a pocket and a strut in the pocket wherein the strut is on a first shaft side of the passive one-way clutch;
the second component including a first surface and a second surface with an opening between the first surface and the second surface of the second component, the first component is disposed in the opening;
the first component, including a first surface facing the first surface of the second component and a second surface facing the second surface of the second component;
the strut of the passive one-way clutch located in a pocket in the first component and extending from the pocket and above the first surface of the first component to the first surface of the second component and coupling the first component and the second component in a first direction of rotation only and allowing the first component to overrun the second component in a second direction of rotation; and
the active one-way clutch including a strut moveable between a non-deployed position wherein the strut is below the second surface of the second component to a deployed position wherein the strut extends above the second surface of the second component to the second surface of the first component, the strut coupling the first component and in the second direction of rotation only and allowing the first component to overrun the second component in the first direction of rotation.

9. The clutch assembly of claim 8 wherein the active one-way clutch includes:
an actuator, the actuator including a stator and a translator, the stator including at least one electromagnetically inductive coil; and
a spring positioned between the translator and the strut mounted in the second component.

10. The clutch assembly of claim 9 wherein:
the spring of the actuator holds the strut between the second surface of the first component and the second surface of the second component in the deployed position coupling the second component to the first component in one direction and overrunning the first component in the opposite direction.

11. A clutch assembly comprising:
a first shaft rotatable about a first shaft rotational axis;
a second shaft rotatable about a second shaft rotational axis;
a first component connected to the first shaft;
a second component connected to the second shaft;
a third component connected to the second component;
a first one-way clutch between the first component and the third component; and
a second one-way clutch between the first component and the second component;
the second component includes a cup-shaped member having a disc-shaped member, having a radially inner end and a radially outer end, the radially inner end closer to the second shaft rotational axis wherein the radially inner end of the disc-shaped member connects the second component to the second shaft;
the cup-shaped member having an annular wall, the annular wall extending axially, the annular wall directly connected to the radially outer end of the disc-shaped member and spaced from the second shaft;
the first component in an opening of the cup-shaped member; and
the third component is connected to the second component, wherein the first component is between the disc-shaped member of the second component and the third component.

12. The clutch assembly of claim 11 wherein:
the first component includes at least one pocket in a first surface and at least one notch in a second surface;
the third component includes at least one notch in a side surface of the third component facing the first surface of the first component; and
the second component includes at least one pocket in a side surface of the second component facing the second surface of the first component.

13. The clutch assembly of claim 12 wherein:
the first one-way clutch includes at least one strut between the pocket in the first surface of the first component and the notch in the side surface of the third component; and
the second one-way clutch includes at least one strut between the pocket in the side surface of the second component and the notch in the second surface of the first component.

14. A clutch assembly comprising:
a first shaft rotatable about a first shaft rotational axis;
a second shaft rotatable about a second shaft rotational axis;
a first component connected to the first shaft;
a second component connected to the second shaft, the second component including a radially extending disc-shaped member having a radial inner end connected to the second shaft and an axially extending annular wall, the annular wall directly connected to the disc-shaped member at a radial outer end;
a third component directly connected to the annular wall of the second component;
a first one-way clutch between the first component and the third component; and
a second one-way clutch between the first component and the second component;
the first one-way clutch includes a spring and a strut, the spring moves the strut to a deployed position between the first component and the third component such that the first component is coupled to the second component in a first direction of rotation and overruns the third component in a second direction of rotation; and the second one-way clutch includes a spring, a strut, and an electromagnetic actuator, the electromagnetic actuator acts on the spring to move the strut pivotally to a deployed position between the first component and the second component such that the second component is coupled to the first component in the second direction of rotation and overruns the first component in the first direction of rotation.

15. The clutch assembly of claim 14 wherein the electromagnetic actuator includes:

a stator having at least one inductive coil;

a translator, wherein the at least one inductive coil acts on the translator; and the spring positioned between the translator and the strut of the second one-way clutch.

\* \* \* \* \*